US012634864B2

(12) United States Patent
Manglani

(10) Patent No.: US 12,634,864 B2
(45) Date of Patent: May 19, 2026

(54) SOFT PREAMBLE FRAMEWORK FOR MESSAGE 1 TRANSMISSION

(71) Applicant: Nokia Technologies Oy, Espoo (FI)

(72) Inventor: Girish Parmanand Manglani, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 400 days.

(21) Appl. No.: 18/487,703

(22) Filed: Oct. 16, 2023

(65) Prior Publication Data

US 2024/0129877 A1 Apr. 18, 2024

(30) Foreign Application Priority Data

Oct. 17, 2022 (IN) .............................. 202241059156

(51) Int. Cl.
*H04W 60/04* (2009.01)
*H04W 8/18* (2009.01)
*H04W 24/02* (2009.01)
*H04W 36/00* (2009.01)

(52) U.S. Cl.
CPC ............. *H04W 60/04* (2013.01); *H04W 8/18* (2013.01); *H04W 24/02* (2013.01); *H04W 36/0033* (2013.01)

(58) Field of Classification Search
CPC .......... G06N 20/00; H04W 8/18–245; H04W 24/02; H04W 28/00–26; H04W 36/0033; H04W 48/12–20; H04W 60/04; H04W 74/00–006; H04W 76/00–18
See application file for complete search history.

(56) References Cited

U.S. PATENT DOCUMENTS

| | | | |
|---|---|---|---|
| 2009/0285180 A1* | 11/2009 | Zhang | H04W 74/0833 370/331 |
| 2011/0134862 A1* | 6/2011 | Huang | H04W 74/08 370/329 |
| 2022/0217781 A1* | 7/2022 | Decarreau | H04W 74/0833 |

OTHER PUBLICATIONS

"Open Radio Access Network (O-RAN) Systems Architecture and Design." Elsevier. Retrieved from <https://app.knovel.com/hotlink/toc/id:kpORANORA1/open-radio-access-network/open-radio-access-network> (Year: 2022).*

* cited by examiner

*Primary Examiner* — Ronald Eisner
(74) *Attorney, Agent, or Firm* — Lippes Mathias LLP

(57) ABSTRACT

A method may include registering with a communication network, and transmitting user equipment activity information to a machine learning engine of the communication network. The method may further include receiving an assigned soft preamble from the machine learning engine based on the user equipment activity information. In addition, the method may include performing message 1 transmission using the assigned soft preamble based on a preamble load. Another method may include receiving user equipment activity information from a network element, and assigning a same soft preamble to a plurality of user equipment based on the user equipment activity information, and based on a map of a network describing preamble load on every preamble in a serving cell and neighboring cells. Additionally, updated user equipment activity information may be received, and the soft preamble may be dynamically updated. The updated soft preamble may then be assigned to the user equipment.

8 Claims, 9 Drawing Sheets

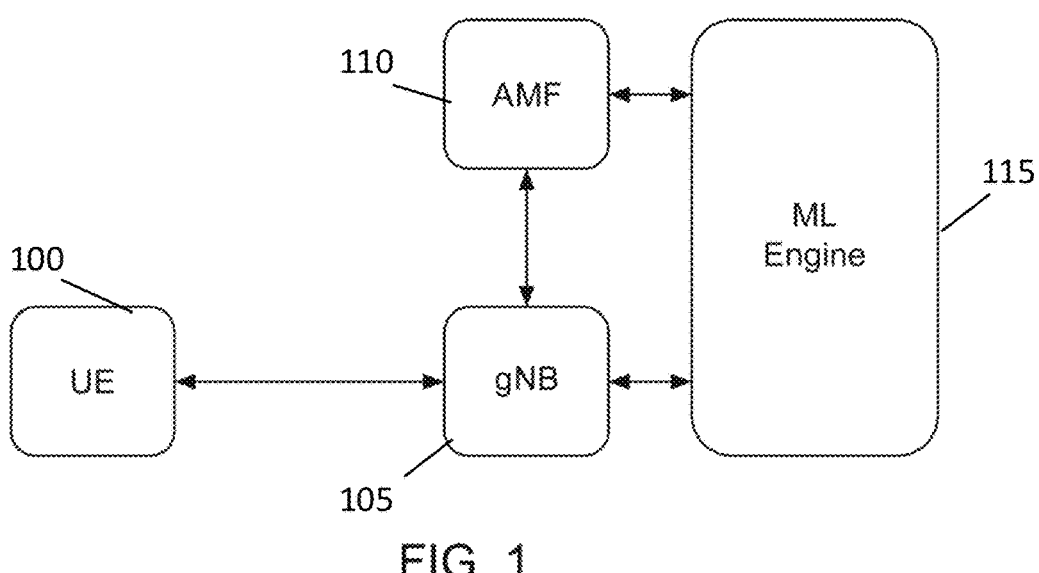
110 AMF
115
ML Engine
100
UE
gNB
105
FIG. 1
| SSB0-3 |
| SSB4-7 |
Preambles are divided between SSBs. Eg: SSB4 to SSB7 can be allocated 16 preambles each.
FIG. 2A
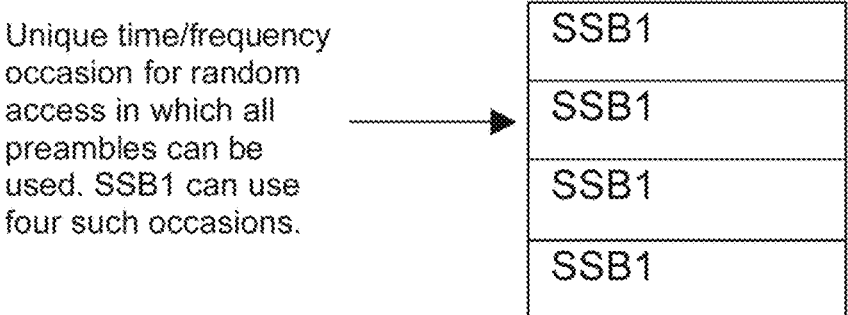
Unique time/frequency occasion for random access in which all preambles can be used. SSB1 can use four such occasions.
| SSB1 |
| SSB1 |
| SSB1 |
| SSB1 |
FIG. 2B

Figure 3:
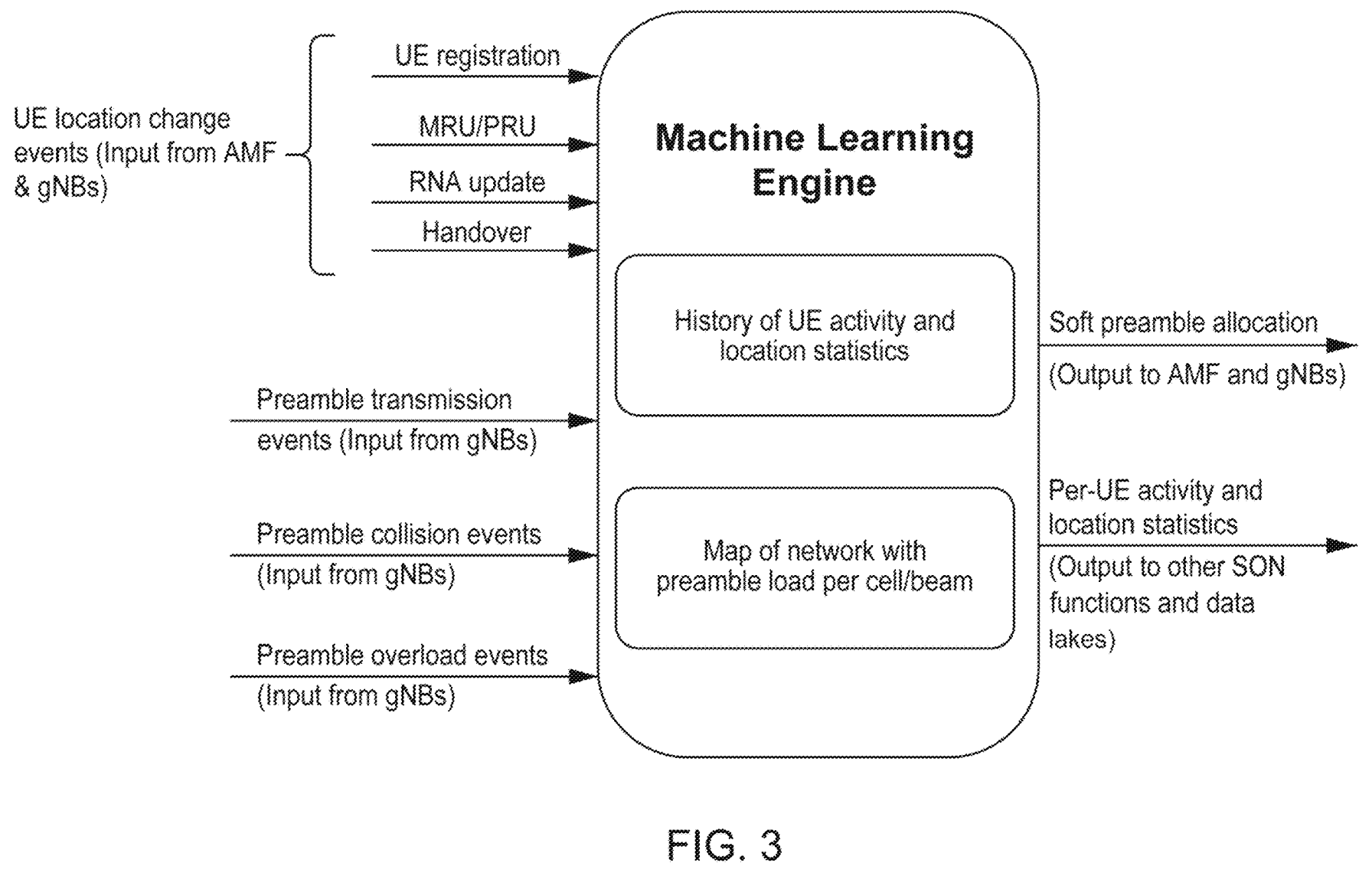

Machine Learning Engine

History of UE activity and location statistics

Map of network with preamble load per cell/beam

UE registration

MRU/PRU

RNA update

Handover

UE location change events (Input from AMF & gNBs)

Preamble transmission events (Input from gNBs)

Preamble collision events (Input from gNBs)

Preamble overload events (Input from gNBs)

Soft preamble allocation (Output to AMF and gNBs)

Per-UE activity and location statistics (Output to other SON functions and data lakes)

Figure 6:
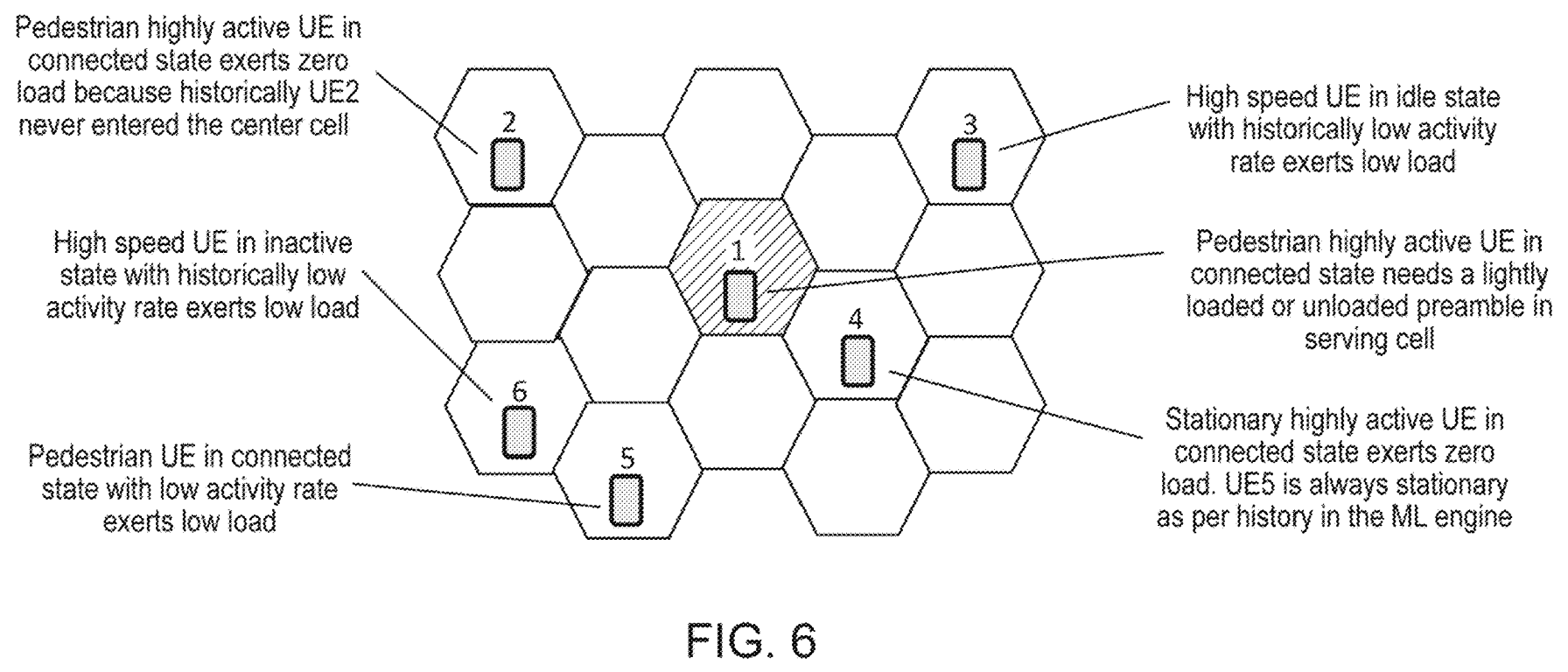

High speed UE in idle state with historically low activity rate exerts low load

Pedestrian highly active UE in connected state needs a lightly loaded or unloaded preamble in serving cell Stationary highly active UE in connected state exerts zero load. UE5 is always stationary as per history in the ML engine Pedestrian highly active UE in connected state exerts zero load because historically UE2 never entered the center cell High speed UE in inactive state with historically low activity rate exerts low load Pedestrian UE in connected state with low activity rate exerts low load PLI=low PLI=medium PLI=low PLI=low

FIG. 7

SOFT PREAMBLE FRAMEWORK FOR MESSAGE 1 TRANSMISSION

FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for a soft preamble framework for message 1 transmission.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, and/or fifth generation (5G) radio access technology or NR access technology. 5G wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

Some example embodiments may be directed to a method. The method may include registering with a communication network. The method may also include transmitting user equipment activity information to a machine learning engine of the communication network. The method may further include receiving an assigned soft preamble from the machine learning engine based on the user equipment activity information. In addition, the method may include performing message 1 transmission using the assigned soft preamble based on a preamble load.

Other example embodiments may be directed to an apparatus. The apparatus may include at least one processor and at least one memory including computer program code. The at least one memory and computer program code may also be configured to, with the at least one processor, cause the apparatus at least to register with a communication network. The apparatus may also be caused to transmit user equipment activity information to a machine learning engine of the communication network. The apparatus may further be caused to receive an assigned soft preamble from the machine learning engine based on the user equipment activity information. In addition, the apparatus may be caused to perform message 1 transmission using the assigned soft preamble based on a preamble load.

Other example embodiments may be directed to an apparatus. The apparatus may include means for registering with a communication network. The apparatus may also include means for transmitting user equipment activity information to a machine learning engine of the communication network. The apparatus may further include means for receiving an assigned soft preamble from the machine learning engine based on the user equipment activity information. In addition, the apparatus may include means for performing message 1 transmission using the assigned soft preamble based on a preamble load.

In accordance with other example embodiments, a non-transitory computer readable medium may be encoded with instructions that may, when executed in hardware, perform a method. The method may include registering with a communication network. The method may also include transmitting user equipment activity information to a machine learning engine of the communication network. The method may further include receiving an assigned soft preamble from the machine learning engine based on the user equipment activity information. In addition, the method may include performing message 1 transmission using the assigned soft preamble based on a preamble load.

Other example embodiments may be directed to a computer program product that performs a method. The method may include registering with a communication network. The method may also include transmitting user equipment activity information to a machine learning engine of the communication network. The method may further include receiving an assigned soft preamble from the machine learning engine based on the user equipment activity information. In addition, the method may include performing message 1 transmission using the assigned soft preamble based on a preamble load.

Other example embodiments may be directed to an apparatus that may include circuitry configured to register with a communication network. The apparatus may also include circuitry configured to transmit user equipment activity information to a machine learning engine of the communication network. The apparatus may further include circuitry configured to receive an assigned soft preamble from the machine learning engine based on the user equipment activity information. In addition, the apparatus may include circuitry configured to perform message 1 transmission using the assigned soft preamble based on a preamble load.

Certain example embodiments may be directed to a method. The method may include receiving user equipment activity information from a network element. The method may also include assigning a same soft preamble to a plurality of user equipment based on the user equipment activity information, and based on a map of a network describing preamble load on every preamble in a serving cell and neighboring cells. The method may further include receiving updated user equipment activity information. In addition, the method may include dynamically updating the soft preamble based on the updated user equipment activity information. Further, the method may include assigning an updated soft preamble to the user equipment based on the dynamic update of the soft preamble.

Other example embodiments may be directed to an apparatus. The apparatus may include at least one processor and at least one memory including computer program code. The at least one memory and computer program code may be configured to, with the at least one processor, cause the apparatus at least to receive user equipment activity information from a network element. The apparatus may also be caused to assign a same soft preamble to a plurality of user equipment based on the user equipment activity information, and based on a map of a network describing preamble load on every preamble in a serving cell and neighboring cells. The apparatus may further be caused to receive updated user equipment activity information. In addition, the apparatus may be caused to dynamically update the soft preamble based on the updated user equipment activity information.

Further, the apparatus may be caused to assign an updated soft preamble to the user equipment based on the dynamic update of the soft preamble.

Other example embodiments may be directed to an apparatus. The apparatus may include means for receiving user equipment activity information from a network element. The apparatus may also include means for assigning a same soft preamble to a plurality of user equipment based on the user equipment activity information, and based on a map of a network describing preamble load on every preamble in a serving cell and neighboring cells. The apparatus may further include means for receiving updated user equipment activity information. In addition, the apparatus may include means for dynamically updating the soft preamble based on the updated user equipment activity information. Further, the apparatus may include means for assigning an updated soft preamble to the user equipment based on the dynamic update of the soft preamble.

In accordance with other example embodiments, a non-transitory computer readable medium may be encoded with instructions that may, when executed in hardware, perform a method. The method may include receiving user equipment activity information from a network element. The method may also include assigning a same soft preamble to a plurality of user equipment based on the user equipment activity information, and based on a map of a network describing preamble load on every preamble in a serving cell and neighboring cells. The method may further include receiving updated user equipment activity information. In addition, the method may include dynamically updating the soft preamble based on the updated user equipment activity information. Further, the method may include assigning an updated soft preamble to the user equipment based on the dynamic update of the soft preamble.

Other example embodiments may be directed to a computer program product that performs a method. The method may include receiving user equipment activity information from a network element. The method may also include assigning a same soft preamble to a plurality of user equipment based on the user equipment activity information, and based on a map of a network describing preamble load on every preamble in a serving cell and neighboring cells. The method may further include receiving updated user equipment activity information. In addition, the method may include dynamically updating the soft preamble based on the updated user equipment activity information. Further, the method may include assigning an updated soft preamble to the user equipment based on the dynamic update of the soft preamble.

Other example embodiments may be directed to an apparatus that may include circuitry configured to receive user equipment activity information from a network element. The apparatus may also include circuitry configured to assign a same soft preamble to a plurality of user equipment based on the user equipment activity information, and based on a map of a network describing preamble load on every preamble in a serving cell and neighboring cells. The apparatus may further include circuitry configured to receive updated user equipment activity information. In addition, the apparatus may include circuitry configured to dynamically update the soft preamble based on the updated user equipment activity information. Further, the apparatus may include circuitry configured to assign an updated soft preamble to the user equipment based on the dynamic update of the soft preamble.

BRIEF DESCRIPTION OF THE DRAWINGS

For proper understanding of example embodiments, reference should be made to the accompanying drawings, wherein:

FIG. 1 illustrates an example architecture with a stand-alone machine learning (ML) engine, according to certain example embodiments.

FIG. 2(*a*) illustrates an example of multiple synchronization signal blocks (SSB s) per physical random access channel (PRACH) occasion, according to certain example embodiments.

FIG. 2(*b*) illustrates an example of multiple PRACH occasions per SSB, according to certain example embodiments.

FIG. 3 illustrates an example of inputs to the ML engine and the resulting soft preamble allocation, according to certain example embodiments.

FIG. 6 illustrates an example load calculation of preamble x, according to certain example embodiments.

FIG. 7 illustrates an example preamble load indication, according to certain example embodiments.

DETAILED DESCRIPTION

Figure 4:
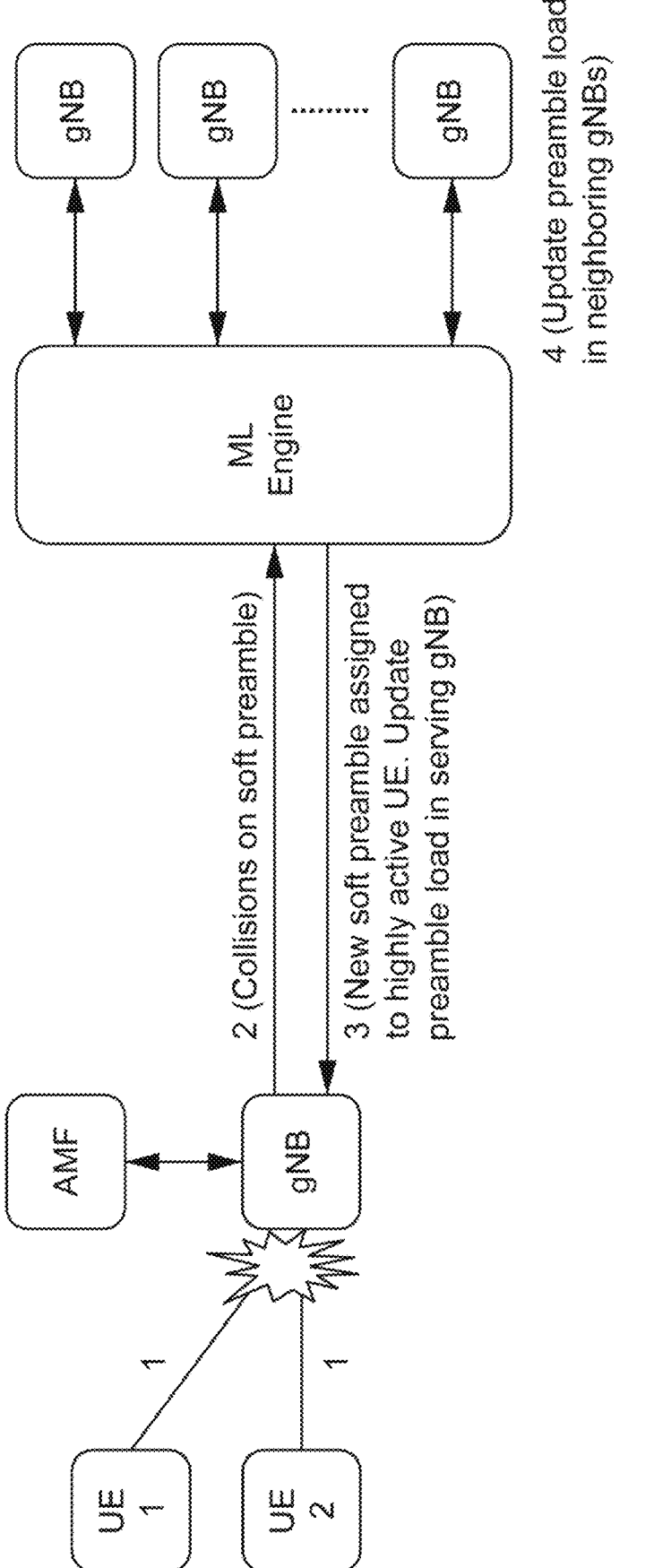
FIG. 4 illustrates an example reconfiguration of a soft preamble, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for a soft preamble framework for message transmission. For instance, certain example embodiments may be directed to a soft preamble framework for Message 1 transmission.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

In 4G as well as 5G networks, during contention-based random access (CBRA), user equipments (UEs) may randomly select a preamble for Message 1 transmission. The preamble may be randomly selected with the intention of avoiding preamble collisions. Such an approach is passive in nature in a sense that the network is unable to ensure that a first transmission of a preamble will not cause a collision. If there is a collision, there may be a backoff mechanism to ensure that the UEs that collided in the first transmission do not collide again. With this approach, it may be possible that the UEs will collide on a subset of the preambles while some other preambles are left completely unused.

The above approach may be suitable for 4G/5G networks which have limited machine learning (ML) capabilities. However, with 5G Advanced and 6G networks, a different approach may be taken. Thus, as described herein, certain example embodiments may provide an ML based framework for preamble allocation and selection known as a soft preamble framework. This framework may actively avoid collisions and does not consider preamble transmission as a random event. Additionally, the framework of certain example embodiments may learn the user activity and mobility statistics of every user in the network and then optimize the allocation of preambles to users, with the intention of reducing Message 1 collisions and ensuring that all preambles allocated to a cell are used efficiently.

Certain example embodiments may provide a soft preamble framework for preamble assignment to a UE and preamble selection during contention-based Message 1 transmission. The soft preamble framework may include various components including but not limited to, for example, a UE connected to the network being assigned a soft preamble. Here, the UE preamble usage statistics and mobility statistics may be continuously fed into an ML engine and used to assign an appropriate soft preamble. In another component, the network may keep track of idle, inactive, and active state mobility of the UE and may update the assigned soft preamble when necessary. In a further component, to aid the UE in preamble selection during Message 1 transmission, the gNB may divide the contention-based preambles into pools. According to certain example embodiments, a probability of preamble transmission on each preamble pool may be calculated by the ML engine. Based on these probabilities, a load indicator signifying the access load on each preamble pool may be broadcasted using system information block type 1 (SIB 1). The load indicator may be used by the UE to select an appropriate preamble for Message 1 transmission.

4G/5G networks may assume that UEs will randomly select a preamble, and that the distribution of users to preambles will be uniformly distributed. However, when there are two or more UEs in a cell that randomly select the same preamble, and those UEs are highly active, this may result in multiple collisions on the same preamble. In some example embodiments, highly active UEs may be characterized as transmitting the preamble, and performing access more frequently as compared to UEs that are not highly active. Additionally, the multiple collisions may occur even if most of the other preambles are unused. In such a case, the network may not have a way of adapting to this situation because the current preamble selection method does not consider UE activity. In the same way, the mobility of UEs is not considered. Some highly active UEs may move into a cell and their preambles may start colliding with preambles of existing UEs within that cell, even if most of the preambles in that cell are unused. The network again may not have a way of adapting to the situation because the preamble selection method is based on a random passive algorithm.

In view of the problems described above in existing networks, certain example embodiments may create a new framework that actively assigns a preamble to a UE, and updates the preamble when necessary. Additionally, in certain example embodiments, UE behavior may be learned via ML, and this learning may be used to actively/adaptively control preamble allocation and selection.

According to certain example embodiments, in the soft preamble framework, every UE that is connected to the network may be assigned a preamble such as, for example, a soft preamble. The soft preamble may be configured such that it is not dedicated to a particular UE. Instead, the multiple UEs may be assigned the same preamble. Additionally, each of the UEs that are assigned the same preamble may use it for message 1 transmission. In other example embodiments, a UE that performs random access more frequently may have a higher probability of using the preamble. As described above, such a UE may be referred to as a highly active user. In some example embodiments, a UE that performs random access less frequently may have a lower probability of using the preamble, and may be referred to as a less active user. Since multiple UEs may be assigned to the same preamble, and the UEs may use the assigned preamble with a certain probability, the assigned preamble may be referred to as a soft preamble. Since each UE may be assigned a soft preamble, the gNB may allocate the preambles so that collisions can be reduced, and all preambles can be used efficiently. The gNB may also adaptively change the allocated soft preambles when collisions increase, or the preambles are not loaded equally. Here, a preamble load may refer to the frequency with which a preamble is used. Additionally, a preamble that is used more frequently may be considered highly loaded, and a preamble that is used less frequently may be considered lightly loaded. However, such an approach may have certain limitations since the user distribution in the cell may change continuously. For example, mobile UEs do not stay in a single cell, and UEs moving in from a nearby gNB may not have a soft preamble assigned and may start colliding with existing UEs in the cell. Alternatively, the UEs moving into this gNB that had a soft preamble assigned by their old gNB may not be optimal from the perspective of the new gNB. Moreover, the new gNB may not know the activity factor of the new UEs that have moved into its coverage area. Thus, to remove these limitations of the simple approach, a holistic network-level framework is needed to perform preamble assignment for all the UEs in the network.

According to certain example embodiments, UEs in a network may be tracked. In particular, the location of the UEs may be known at a granularity of cell, RAN-based notification area (RNA), or registration area (RA). In certain example embodiments, the location may be used during the paging process, and may be readily available in the network. Additionally, the location of the UEs may be taken from the gNB and AMF and fed into an ML engine. Further, the preamble usage of each UE may be tracked and stored in the ML engine. The ML engine may be aware of how many UEs are present in a particular cell, RNA, or RA. Based on history, the ML engine may also know which of these UEs are likely to perform a preamble transmission. The ML engine may further be aware of the mobility patterns of a UE. For example, the ML engine may know which areas the UE will move into and probably perform a preamble transmission. Additionally, the ML engine may know if a UE transmits a preamble more or less frequently, and in which cells. In other example embodiments, the ML engine may have this information of the UEs concerning their location and frequency of preamble transmission because almost all UEs are always switched on. Thus, in certain example embodiments, the ML engine may create a map of the network and calculate the probability of preamble transmission from each one of the UEs in a particular cell. Based on this map of the network, the ML engine may assign a soft preamble to each UE. The assignment may ensure that all contention-based preambles are efficiently loaded, and preamble collisions are minimized.

FIG. 1 illustrates an example architecture with a standalone ML engine, according to certain example embodiments. In particular, FIG. 1 illustrates an architecture where the UE 100 is in direct communication with the gNB 105 to which the UE 100 is connected. The gNB 105 may relay information received from the UE 100 to the ML engine 115 and the AMF 110. As illustrated in FIG. 1, the gNB 105 and AMF 110 may be communicatively connected, and both entities may be in direct communication with the ML engine 115.

As described above, UEs that are connected to the network may be assigned a soft preamble (i.e., SoftPre). According to certain example embodiments, a SoftPre may be defined as an index of the preamble in the range of 0 to 63 considering that the maximum number of preambles allocated to a single beam/synchronization signal block (SSB) may be Maxpre=64. While SoftPre may be allocated to a UE assuming Maxpre=64, it may be possible that the cell/beam where the UE potentially transmits a preamble has fewer contention-based preambles allocated to it. In certain example embodiments, if the number of preambles allocated to a certain beam is less than Maxpre (i.e., more than one SSBs correspond to a time/frequency physical random access channel (PRACH) occasion), the preamble index on which the UE transmits may be derived by scaling the SoftPre value accordingly.

FIG. 2(*a*) illustrates an example of multiple SSBs per PRACH occasion, according to certain example embodiments. With the example illustrated in FIG. 2(*a*), in one example scenario, it may be assumed that a UE is allocated a SoftPre=44 by the ML engine, and 16 preambles are allocated to a certain beam to which the UE is connected. The UE may then use a preamble equal to floor(44/4)=11th preamble from among the preambles allocated for that beam. From the perspective of the gNB, all UEs with a SoftPre value from 44 to 47 in the network may map to the 11th preamble for this beam. According to certain example embodiments, the load on preamble number 11 for this beam in this cell may be calculated by the ML engine by adding the load from UEs having SoftPre=44 to 47, provided the UEs are located in the cell or its immediate vicinity. This is an example of a continuous mapping of 4 SoftPre to one preamble. In some example embodiments, when the number of preambles for a beam does not multiply exactly into 64, an interleaved mapping may be more useful. For example, SoftPre=0, 16, 32, 48 can map to 0th preamble for this beam.

In certain example embodiments, if an SSB maps to more than one PRACH occasion in the system with 64 preambles on each occasion, the gNB may assume that the UE can use any one of the occasions to transmit. This is shown, for example in FIG. 2(*b*), which illustrates an example of multiple PRACH occasions per SSB. According to certain example embodiments, if the mapping of FIG. 2(*b*) is used widely in the network, then gNB may assume Maxpre=Totro*64, where Totro is the number of PRACH occasions to which an SSB is mapped. A higher value of Maxpre reduces the chances of collision accordingly. In cases where number of PRACH occasions is less than Totro, scaling of the Softpre to the actual preamble may be done using the same principles as given above.

According to certain example embodiments, in soft preamble allocation, information about all UEs in the network may be available at the ML engine to create a map of the network. The map may contain statistics about the preamble load on the preambles available in every cell/beam, which may subsequently be used to allocate the soft preamble. FIG. 3 illustrates an example of inputs to the ML engine and the resulting soft preamble allocation, according to certain example embodiments. As illustrated in FIG. 3, the inputs to the ML engine may include UE activity. According to certain example embodiments, the UE activity may include preamble transmission events (input from the gNBs), preamble overload events (input from the gNBs), and preamble collision events (input from the gNBs). The inputs may also include idle/inactive state mobility information of the UE, and connected state mobility information of the UE. In particular, the UE location change events (input from the AMF and gNBs) may include information of UE registration to the network, mobility registration update/periodic registration update (MRU/PRU), RNA update, and handover information related to the UE. According to certain example embodiments, with all the inputs, the ML engine may perform analysis and complex decision-making to allocate soft preambles and calculate/generate per-UE activity and location statistics.

As described above, one type of input provided to the ML engine may include UE activity. In this regard, consider a UE for which the history of user activity related statistics is not available in the ML engine, and the UE also does not have a soft preamble assigned to it. When the UE powers up and registers with the network, a context may be created for the UE in the ML engine, and the UE may be assigned a soft preamble, such as, for example, an unused or lightly loaded preamble since the UE activity statistics are unknown. Subsequently, the preamble transmission events of the UE may be tracked, and the ML engine may learn and update UE activity statistics accordingly. Thus, according to certain example embodiments, the ML engine may start learning about the load the UE exerts on preamble consumption and create a history of UE activity statistics. According to certain example embodiments, a very active user will result in the load factor increasing substantially on the soft preamble assigned to it, and vice versa for a less active user.

FIG. 4 illustrates an example reconfiguration of a soft preamble, according to certain example embodiments. In certain example embodiments, if a UE for which the ML engine has no context is assigned a soft preamble which suddenly starts colliding with another UE (reference 1 in FIG. 4), it may be possible to change the soft preamble assigned to one of the UEs involved. At reference 2 in FIG. 4, the gNB may inform the ML engine about the collisions on the soft preamble. Once the ML engine is informed of the collisions, at reference 3, the soft preamble for the more active UE may be changed. Further, the new soft preamble may be sent to the UE in connected mode using a radio resource control (RRC) reconfiguration. The assignment of the new soft preamble may change the load on the old as well as the new soft preamble. Thus, at reference 4, the ML engine may also update nearby gNBs about this change so that the nearby gNBs can modify the load on the old and new soft preamble accordingly.

In other example embodiments, two UEs that are assigned the same soft preamble may behave unlike their statistical history, and become highly active in the same cell and, thus, create a preamble overload situation. In this case as well, the soft preamble assigned to one of the UEs may be changed in the same way described above with respect to FIG. 4. Thus, as illustrated in the example of FIG. 4, when there may be a communication between the UE and the gNB, the soft preamble may be reconfigured on the fly, and performance may be optimized. Additionally, according to certain example embodiments, as the ML engine gathers increasingly more data about UE activity, the probability of such cases may be closer to zero.

As noted above, another input to the ML engine may include the idle/inactive state mobility information of the UE. In this regard, when a UE performs registration, the AMF may retrieve a soft preamble from the ML engine and send it to the UE via an initial context setup message. According to certain example embodiments, the soft preamble assigned to the UE may take into consideration preamble load in the serving gNB and nearby gNBs.

Once the UE receives the soft preamble, the UE may be tracked when the UE is in the idle/inactive state. In 5G networks, a UE in the idle/inactive state may move across the network changing cells within RA/RNA without informing the network. In certain example embodiments, the load on the soft preamble assigned to the UE may be increased in the gNBs that comprise the RA/RNA, because the UE could transmit a preamble in any of the gNBs. The increase in load may be proportional to the predicted UE activity (i.e., amount of preamble transmissions expected from the UE based on history stored in the ML engine).

In certain example embodiments, when a UE in idle/inactive state performs mobility registration update (MRU) or RNA update (RNAU) when crossing an RA/RNA boundary, the AMF/gNB may inform the ML engine about the updates. After receiving the information, the ML engine may reduce the preamble load for the soft preamble assigned to the UE in the gNBs in the old RA/RNA. The ML engine may also ask the AMF to change the soft preamble assigned to the UE based on the preamble load in the new RA/RNA. Additionally, in other example embodiments, periodic registration update or periodic RNA update may be used to change the soft preamble assigned to the UE, even if the UE has not crossed the RA/RNA boundary. Thus, a UE that is powered up and has a soft preamble assigned to it may be taken into consideration by the network for calculating preamble load, even if the UE is idle or inactive. This aspect of tracking idle/inactive state UEs may substantially increase the accuracy of the ML engine in predicting the preamble load.

As previously noted, a further input to the ML engine may include connected state mobility information of the UE. In this regard, when handovers occur when the UE is in a connected state, it may be possible for the target gNB to provide dedicated preambles for the UE to perform contention-free random access (CFRA). In some cases, when dedicated preambles are not provided, the UE must perform a CBRA. In this case, having a soft preamble assigned to the UE may be useful.

Figure 5:
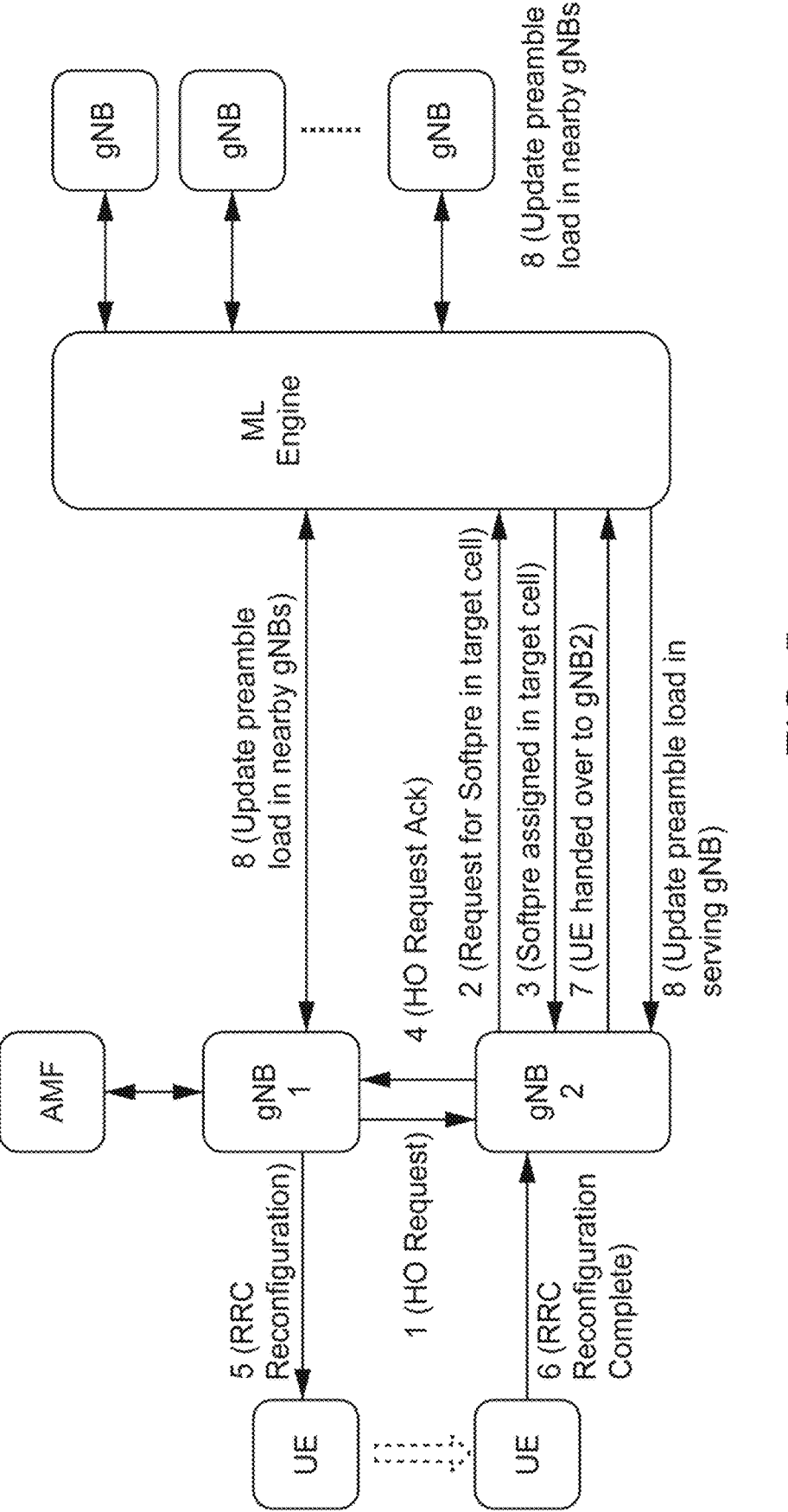
FIG. 5 illustrates an example of soft preamble assignment during handover, according to certain example embodiments.

FIG. 5 illustrates an example of SofPre assignment during handover, according to certain example embodiments. As illustrated in FIG. 5, at reference 1, the target gNB (i.e., gNB2) may receive a handover request. After receiving the handover request, at reference 2, the target gNB may request the ML engine for a suitable SoftPre in the target cell. According to certain example embodiments, the target gNB may make this request because the SoftPre currently assigned to the UE might not be optimal in gNB2. At reference 3, the ML engine may provide a new SoftPre to gNB2, which, at reference 4, may be sent to the serving gNB (i.e., gNB1) in a handover request acknowledgment message. At reference 5, the serving gNB may send the new SoftPre to the UE in an RRC reconfiguration message. According to certain example embodiments, the ML engine may ensure that the new SoftPre assigned to the UE in the target cell is lightly loaded, thereby reducing collisions during CBRA.

As further illustrated in FIG. 5, at reference 6, the UE may send an RRC reconfiguration complete message to the target cell (gNB 2), and at reference 7, the gNB2 may inform the ML engine that gNB2 is now the serving gNB. The ML engine may then reduce the preamble load on the old SoftPre that was allocated to the UE, and update the preamble load on the new SoftPre. At reference 8, the ML engine may share this updated load information with nearby gNB s. According to certain example embodiments, if the UE enters idle/inactive state, the UE may attempt preamble transmission using the new SoftPre in gNB2 or nearby gNBs.

In certain example embodiments, the assignment of the soft preamble may take mobility statistics of the UE into consideration. For example, a UE which is known as a highly mobile UE (e.g., a UE that crosses multiple cell boundaries within a time span of a few minutes) based on the output of the ML engine may be assigned a preamble that is lightly loaded in nearby gNBs; whereas a slow-moving UE (e.g., a UE that crosses a cell boundary after tens of minutes) or stationary UE would not require stringent application of such a consideration by the ML engine.

According to certain example embodiments, during beam change, only a single gNB may be involved. For example, the SoftPre may not be changed during beam change procedures. When the UE transmits a preamble, the beam on which the preamble was transmitted may be informed to the ML engine so that the preamble usage statistics may be available per beam.

As previously described, the ML engine may create a map of the network and perform soft preamble allocation. As illustrated in FIG. 3, the ML engine may be informed about UE location change events and UE activity related events by the AMF and gNB. Based on these inputs, the ML engine may maintain two databases. One database may contain the history of location and activity statistics for all the UEs in the network. A second database may contain a map of the network with load per preamble. According to certain example embodiments, the load per preamble may be maintained for every preamble of every cell/beam in the network. For example, if 64 preambles are available in a cell, the amount of load on each of those 64 preambles is maintained. This metric may be maintained for all the cells/beams in the network. Additionally, the ML engine may update both databases in real time based on the inputs received. When the ML engine is requested to allocate a soft preamble for a UE, the ML engine may use the input data and the information in the two databases and allocate a soft preamble that will ensure that collisions are minimized in and around the gNB where the UE is located. The ML engine may also ensure that the contention-based preambles in a cell/beam are used efficiently. In certain example embodiments, efficiency may correspond to all the preambles being used equally, and none of the preambles are left unused.

According to certain example embodiments, the ML algorithm for creating a map of the network and performing soft preamble allocation may take into account various domain-specific principles. For instance, a highly active UE may exert a proportionally higher load on the soft preamble allocated to it when compared with a less active UE. Further, when a mobile UE is assigned a SoftPre in the serving gNB, the load on the preamble pointed to by SoftPre in serving gNB and adjacent gNBs may increase. The load on the preamble may increase because the UE may experience radio link failure (RLF) on the serving gNB and attempt preamble transmission on the serving gNB. Additionally, the UE may go idle on the serving gNB, move to an adjacent gNB, and attempt preamble transmission. This aspect of sharing updated load information is illustrated in reference 4 in FIG. 4 and reference 8 in FIG. 5.

Additional guiding principles may include, for example when a UE is assigned a SoftPre in a serving gNB, the load on the assigned SoftPre in adjacent gNBs may be proportional to the UE speed. For example, a stationary UE may increase the preamble load on its assigned SoftPre only in the serving gNB. The number of adjacent gNBs where load will increase on the SoftPre may be proportional to the speed of the UE, and the speed of the UE may be determined from the frequency of mobility events. Further, a UE in connected state may result in a higher preamble load compared to an idle/inactive UE because there is a higher probability of this UE attempting preamble transmission again. Additionally, when a UE moves out of a RA/RNA resulting in a MRU/RNAU, load on the SoftPre assigned to the UE may be decreased in the gNBs of the RA/RNA where this UE had previously caused an increase in preamble load.

Another guiding principle may be that when the UE is assigned a new SoftPre in the new RA/RNA, gNBs in nearby RA/RNAs, which are adjacent to the edge of the new RA/RNA, may consider load on the SoftPre assigned to the UE in the new RA/RNA. This may be necessary because when the UE eventually moves out of the new RA/RNA, the UE may perform MRU/RNAU on gNB of a nearby RA/RNA. Additionally, UE activity statistics may be a function of time due to aspects like gNBs located in office areas or residential areas. UE may be active in some gNBs during certain times or days, and not so during other times or days. In some example embodiments, when the UE does not perform periodic registration update (PRU) or periodic RNAU for a long time (e.g., more than one day), the preamble load from the UE may be assumed to be zero because the UE may have moved out of the network coverage area or switched off. According to other example embodiments, preamble load due to a UE may be highest when it is active, medium when it is in an inactive state, low when it is in an idle state, and zero when it is switched off. Further, the preamble load due to a UE may gradually decrease as the time increases since its last preamble transmission.

FIG. 6 illustrates an example load calculation of preamble x, according to certain example embodiments. In particular, FIG. 6 illustrates calculation of load on preamble x in a cell due to nearby UEs. As illustrated in FIG. 6, the center cell where UE1 is located is the serving cell for UE1. It may be assumed that 64 preambles are available in the cells for contention-based access, thus, there is no need to scale the SoftPre value. UE1 may be assigned a soft preamble, and the ML engine may evaluate the activity/mobility statistics of various UEs in conjunction with the preamble load on each preamble and then assign a soft preamble to UE1. Further, FIG. 6 shows a snapshot of the instance when SoftPre=x is evaluated by the ML engine. The ML engine may find that preamble x is not assigned to any UE in the center cell and, thus, preamble x may be suitable for the highly active UE1.

As further illustrated in FIG. 6, the ML engine may find 6 additional UEs within nearby cells whose SoftPre value is also equal to x. In this finding, the ML engine may also account for these UEs when calculating the load on preamble x in the center cell to ensure that collisions are minimized. For example, to find the predicted load on preamble x in the center cell, the ML engine may sum up the probability of access on SoftPre=x due to UEs in the serving center cell and due to UEs in nearby cells which might move into the center cell. Due to various reasons mentioned in FIG. 6, the ML engine may conclude that UE3 and UE6 might have a low probability of entering the center cell and performing a preamble transmission. Further, UE2 and UE4, although highly active, may be unlikely to enter the center cell. Thus, the preambles of UE2 and UE4 may never collide with the preamble of UE1. Additionally, UE5 may have a low activity rate and may be in low speed. Thus, UE5 may also have a very low probability of colliding with UE1. Accordingly, the ML engine may find that SoftPre=x in the center cell is very lightly loaded due to the nearby UEs which are assigned the same SoftPre=x.

According to certain example embodiments, the ML engine may ascertain if and how UE1 will create preamble load on SoftPre=x in other cells. Due to the pedestrian speed of UE1, this is unlikely. Instead, a case of concern may be UE1 moving into the cell containing UE4. According to the history in the ML engine, the likelihood of UE1 moving into the cell containing UE4 is very low. Even if it occurs, both UE1 and UE4 are highly active. Thus, if UE1 and UE4 collide, the soft preamble of one of these UEs can be reconfigured as per the procedure in FIG. 4. According to certain example embodiments, the ML engine may perform this reconfiguration when it senses that UE1 is moving towards the cell containing UE4. Thus, the ML engine may decide that SoftPre=x is a good candidate for assignment to UE1.

As noted above, certain example embodiments may take into consideration 6 UEs in nearby cells having the same SoftPre. In a highly loaded system, this number may be much larger. However, the principles may remain the same. For example, multiple UEs using the same SoftPre in the same cell may not collide if their activity factors are low because they use different PRACH occasions in time for transmission of the same SoftPre. Thus, the soft preamble framework of certain example embodiments may consider activity and mobility statistics of all UEs that are switched on in the network. This may provide an almost deterministic view of the preamble usage for each UE, which may be used by the ML engine to predict preamble load in all cells/beams in the network and allocate a suitable soft preamble to a candidate UE. Additionally, this may achieve the objectives of reducing preamble collisions throughout the network and ensuring that preamble usage is maximized. According to other example embodiments, the data collected by the ML engine can also be used to optimize other objectives.

In certain example embodiments, the UE may use the soft preamble assigned to it to perform preamble transmission. Although the UE has been assigned a SoftPre (i.e., soft preamble), the UE can't know if there are other UEs that are using the same SoftPre in the cell/beam where it is currently located. It is possible that multiple UEs are present with the same SoftPre in a particular cell/beam. While accessing a cell/beam, it may be preferable to make the UE aware if sending a Message 1 using its assigned SoftPre will succeed or not. Therefore, according to certain example embodiments, a gNB may signal the preamble load on the preambles available in a cell/beam to the UE.

Figure 7:
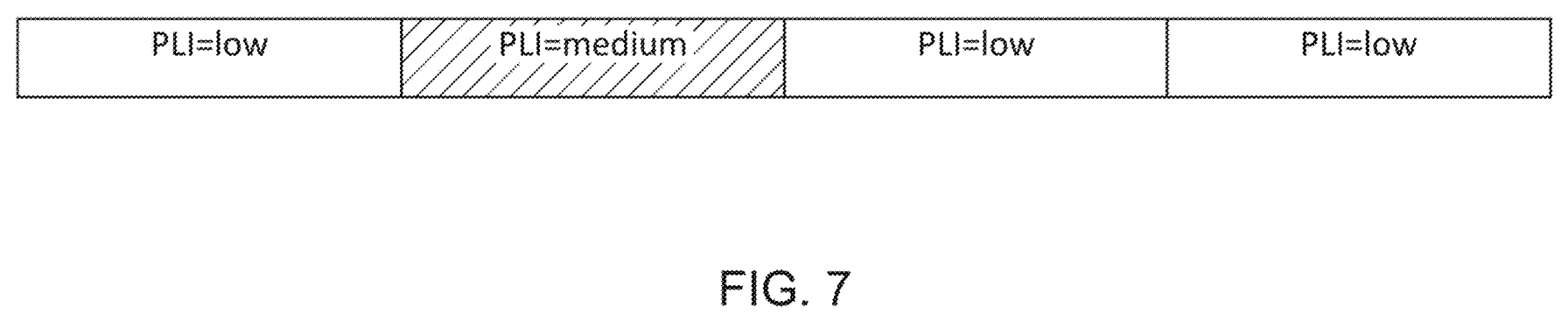

FIG. 7 illustrates an example preamble load indication, according to certain example embodiments. In particular, FIG. 7 illustrates an example preamble load indication when Numpool=4, and there are 4 preambles per pool. With reference to FIG. 7, signaling the load on each preamble may increase the signaling overhead drastically. Thus, certain example embodiments may group the preambles available in a cell/beam into Numpool number of pools, and broadcast a single preamble load indicator (PLI) value per pool. Certain example embodiments may also ensure that preambles in a pool are almost equally loaded, so that based on the pool's PLI, the UE can implicitly estimate the load on its assigned SoftPre. The load of all preambles in the pool may be averaged to arrive at the PLI value for the pool. Based on configurable load thresholds, this PLI value may be signaled to the UE. For example, the PLI may be signaled as zero, low, medium, or high. The PLI may then be broadcasted via SIB1 to the UE.

Referring back to FIG. 6, the ML engine may sum up the probability of access on SoftPre=x due to UEs in the serving cell (i.e., center cell) and nearby cells to find the load on preamble x. The ML engine may also assign a soft preamble considering UEs in adjacent cells because the ML engine may predict potential future collision scenarios on a soft preamble which will stay assigned to a UE for seconds, minutes or hours. However, the signaling of preamble load may be performed by the gNB in real-time using SIB 1, which may have a frequency of 160 ms. Thus, the preamble load that is signaled to the UE could make use of the more accurate real-time preamble load due to the UEs currently "within" the cell/beam, in conjunction with the cell preamble load statistics shared by the ML engine. Relating this with the illustration in FIG. 6, the PLI in the pool containing preamble x could be low in a SIB1 transmission when UE1 has been idle for a few seconds. If UE1 becomes active and transmits a preamble, then in the next SIB 1 transmission, the PLI may stay low or become medium depending on activity factors of the UEs on the other three preambles in that pool. Thus, in certain example embodiments, the UEs trying to attempt preamble transmission in the cell may be updated about the load in their pool at a granularity of 160 ms.

According to certain example embodiments, the UE may select a preamble for Message 1 transmission based on PLI. For instance, a UE may randomly select a preamble for Message 1 transmission during CBRA. On the other hand, the framework described herein may provide advanced tools to perform preamble selection based on PLI. According to certain example embodiments, to exemplify the flexibility and advanced use cases facilitated by the soft preamble framework, the UE may have several ways of selecting the preamble.

According to certain example embodiments, if the UE has a SoftPre assigned to it, then based on the PLI sent via SIB 1, the UE may be able to determine the load in the pool where its SoftPre belongs. In some example embodiments, the actual preamble selected by the UE for Message 1 transmission may depend on the PLI in its pool and other pools. For instance, in one example implementation, a 1-bit PLI field with values of low and high may be used. If the PLI is low in the pool where the SoftPre of the UE is located, then the UE can directly use its SoftPre for Message 1 transmission. In certain example embodiments, if the PLI is signaled as high in the UE's pool, there may be a high probability of collision amongst UEs assigned to the same SoftPre in this pool. In this case, if one of the other pools is lightly loaded, the UE may randomly pick a preamble from that pool. However, if all the pools are highly loaded, the access scheme in this case may default to an existing scheme defined in 3GPP TS 38.321. In comparison, a legacy UE may continue to randomly select a preamble and could face a collision if the selected preamble is loaded. The existing scheme defined in 3GPP may have no prior information about which preambles are highly loaded. Thus, the soft preamble framework according to certain example embodiments may provide improved performance if at least one lightly loaded pool were available, and a performance at least as equal to the current one specified in 3GPP if all pools are highly loaded. Moreover, any UE accessing the cell/beam may virtually have a collision-free performance if its pool is lightly loaded, something which cannot be ensured by the current preamble selection approach in 3GPP.

According to certain example embodiments, it may be possible to enhance the soft preamble framework and implement advanced use cases including, for example, providing a simple extension (e.g., a 2-bit or 3-bit PLI field) to provide more granularity in controlling UE preamble transmission. Additionally, the ML engine may load the pools unequally to create differentiated collision probabilities in different pools. In other example embodiments, it may be possible to keep one pool of resources free or extremely lightly loaded. This may be used by UEs whose pool is highly loaded. It may also be used by UEs which have just powered on after a long time and, thus, do not have a SoftPre assigned. It may further be used by UEs which have roamed into an area where their SoftPre is not maintained and, thus, they need to obtain a SoftPre. This pool may also be used by a UE which encountered a collision while using the SoftPre that was assigned to it. Thus, using a lightly loaded pool may ensure that this UE only encounters a single collision.

Although 3GPP has defined an extensive set of QoS mechanisms in 5G to support differentiated QoS for various applications such as massive machine-type communications (mMTC), ultra-reliable low latency communications (URLLC), enhanced mobile broadband (eMBB), and their derivatives, call setup time still does not have a proper QoS differentiation framework for differentiation between applications and UEs. Additionally, Message 1 transmission still uses similar methods that were used in 4G and earlier technologies. By using the soft preamble framework of certain example embodiments described herein, the problem of not having a proper QoS differentiation framework may be addressed by providing differentiated Message 1 transmission for different applications. For instance, according to some example embodiments, separate pools may be used for mMTC and URLLC UEs. In an example where there are 8 preamble pools, based on the number of mMTC and URLLC users, the number of pools dedicated for each service type may be controlled based on feedback from the ML engine. mMTC pools may have multiple users assigned to the same SoftPre, with the ML engine performing preamble assignment to ensure that collisions are minimized. URLLC pools may have fewer UEs assigned to the same SoftPre to ensure virtually collision-free performance for lower setup latency. When the number of URLLC UEs increases, an mMTC pool may be freed up for URLLC UEs. Additionally, differentiation of UEs within the pools may also be possible. For example, a platinum grade URLLC UE may be assigned a SoftPre with a low probability of collision. A bronze grade URLLC user would be assigned a SoftPre that has a higher probability of collision with other URLLC UEs. The soft preamble framework makes it possible to provide differentiated Message 1 performance for every UE by controlling the preamble collision probability for each UE's SoftPre.

With the soft preamble framework of certain example embodiments described herein, it may be possible to create graded service classes with the collision probability ranging between 0 and 1. The collision probability may be controlled on the fly by the ML engine. This attribute of the soft preamble framework may enable a rich set of current/future applications which require different call setup success rates. As discussed above, this graded control of collision probability may provide graded service to users—platinum users may receive soft preambles with low collision probabilities and dedicated pools with low PLI. Bronze users may be assigned soft preambles with higher collision probabilities, and are not allowed access to dedicated pools. These advantages are in contrast to existing methods in 3GPP, which provide binary control of collision probability—CFRA may be completely free of collisions, and CBRA may have no guarantees on collision probability.

Figure 8:
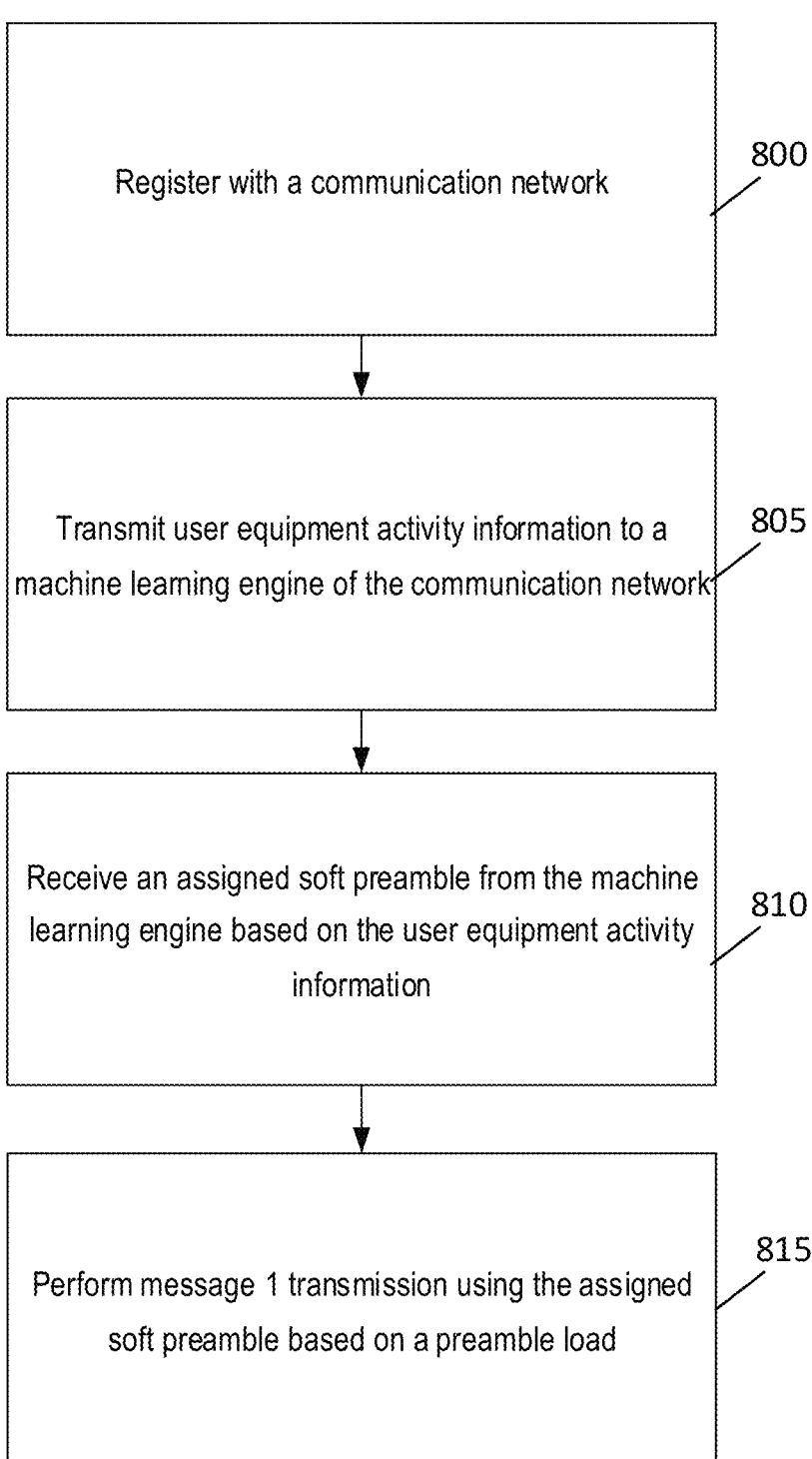
FIG. 8 illustrates an example flow diagram of a method, according to certain example embodiments.

FIG. 8 illustrates an example flow diagram of a method, according to certain example embodiments. In an example embodiment, the method of FIG. 8 may be performed by a network entity, or a group of multiple network elements in a 3GPP system, such as LTE or 5G-NR. For instance, in an example embodiment, the method of FIG. 8 may be performed by a UE similar to one of apparatuses 10 or 20 illustrated in FIG. 10.

According to certain example embodiments, the method of FIG. 8 may include, at 800, registering with a communication network. The method may also include, at 805, transmitting user equipment activity information to a machine learning engine of the communication network. The method may further include, at 810, receiving an assigned soft preamble from the machine learning engine based on the user equipment activity information. In addition, the method may include, at 815, performing message 1 transmission using the assigned soft preamble based on a preamble load.

According to certain example embodiments, the method may further include receiving an updated soft preamble from the machine learning engine based on changes in the user equipment activity information. According to other example embodiments, the user equipment activity information may include at least one of user equipment location change events, preamble transmission, preamble overload, or preamble collision events. In certain example embodiments, the user equipment location change events may include at least one of user equipment registration to a network, a mobility registration update or a periodic registration update, a radio access network based notification area update, or handover information of a user equipment.

Figure 9:
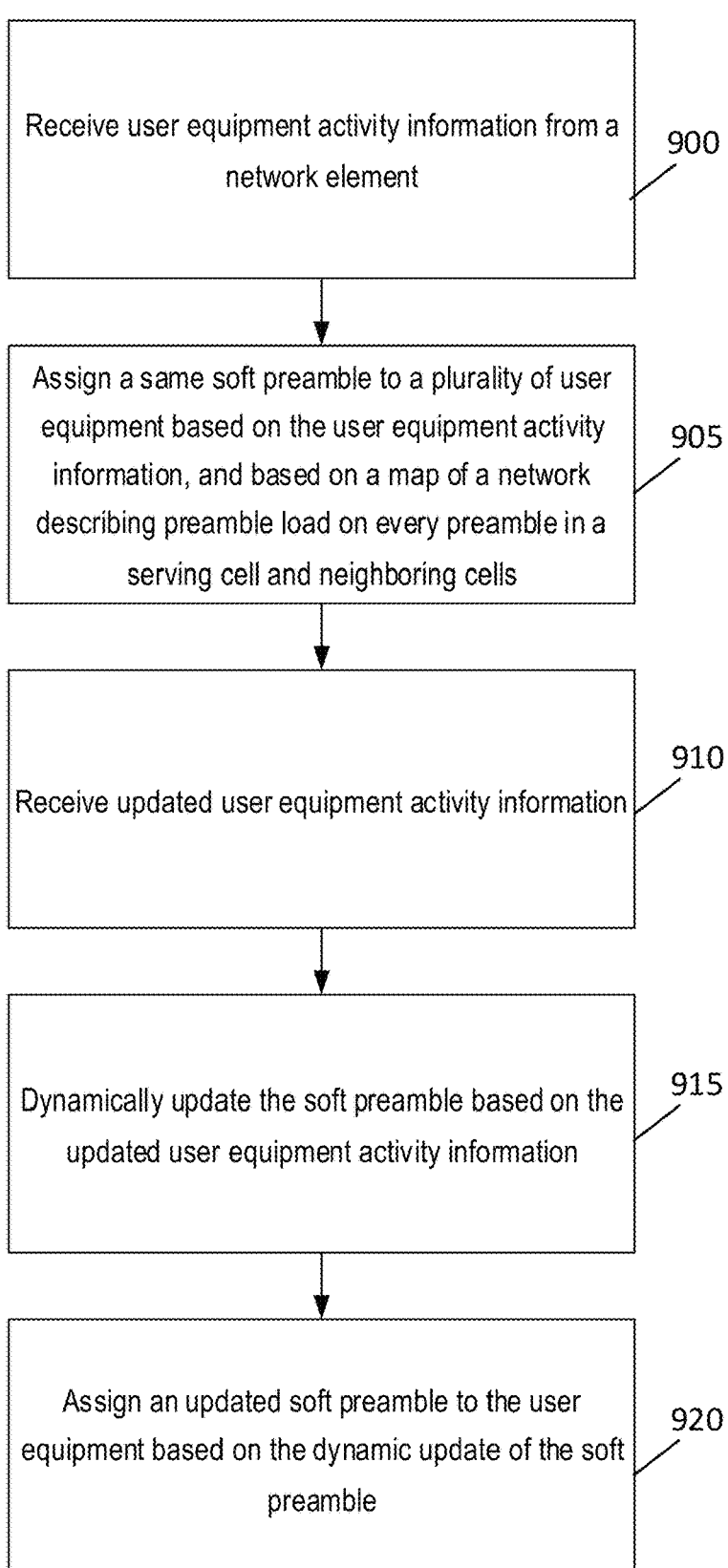
FIG. 9 illustrates an example flow diagram of another method, according to certain example embodiments.

FIG. 9 illustrates an example of a flow diagram of another method, according to certain example embodiments. In an example embodiment, the method of FIG. 9 may be performed by a network entity, or a group of multiple network elements in a 3GPP system, such as LTE or 5G-NR. For instance, in an example embodiment, the method of FIG. 9 may be performed by a network, cell, gNB, or any other device similar to one of apparatuses 10 or 20 illustrated in FIG. 10.

According to certain example embodiments, the method of FIG. 9 may include, at 900, receiving user equipment activity information from a network element. The method may also include, at 905, assigning a same soft preamble to a plurality of user equipment based on the user equipment activity information, and based on a map of a network describing preamble load on every preamble in a serving cell and neighboring cells. The method may further include, at 910, receiving updated user equipment activity information.

In addition, the method may include, at 915, dynamically updating the soft preamble based on the updated user equipment activity information. Further, the method may include, at 920, assigning an updated soft preamble to the user equipment based on the dynamic update of the soft preamble.

According to certain example embodiments, the method may further include dynamically learning about a load that a user equipment exerts on preamble consumption based on the user equipment activity information, creating a history of user equipment activity statistics based on changes in the user equipment activity information, and creating the map of the network describing preamble load on every preamble in every cell in the network. According to other example embodiments, the user equipment activity information include at least one of preamble transmission, preamble overload, preamble collision events, or user equipment location change events. According to some example embodiments, the user equipment location change events may include at least one of user equipment registration to the network, a mobility registration update or a periodic registration update, a radio access network based notification area update, or handover information of a user equipment.

In certain example embodiments, the method may further include receiving a notification of a preamble collision event of the user equipment by a network element. In some example embodiments, the method may also include informing neighboring network elements from the user equipment about the updated soft preamble, and adjusting a load of a previous soft preamble of the user equipment, and a load of the updated soft preamble. In other example embodiments, the method may further include receiving a request for a soft preamble in a target cell based on a handover request of the user equipment. Additionally, in certain example embodiments, the method may further include determining how the user equipment will create preamble load on soft preamble of cells and user equipments of the cells. In other example embodiments, the updated soft preamble results in an updated preamble load.

Figure 10:
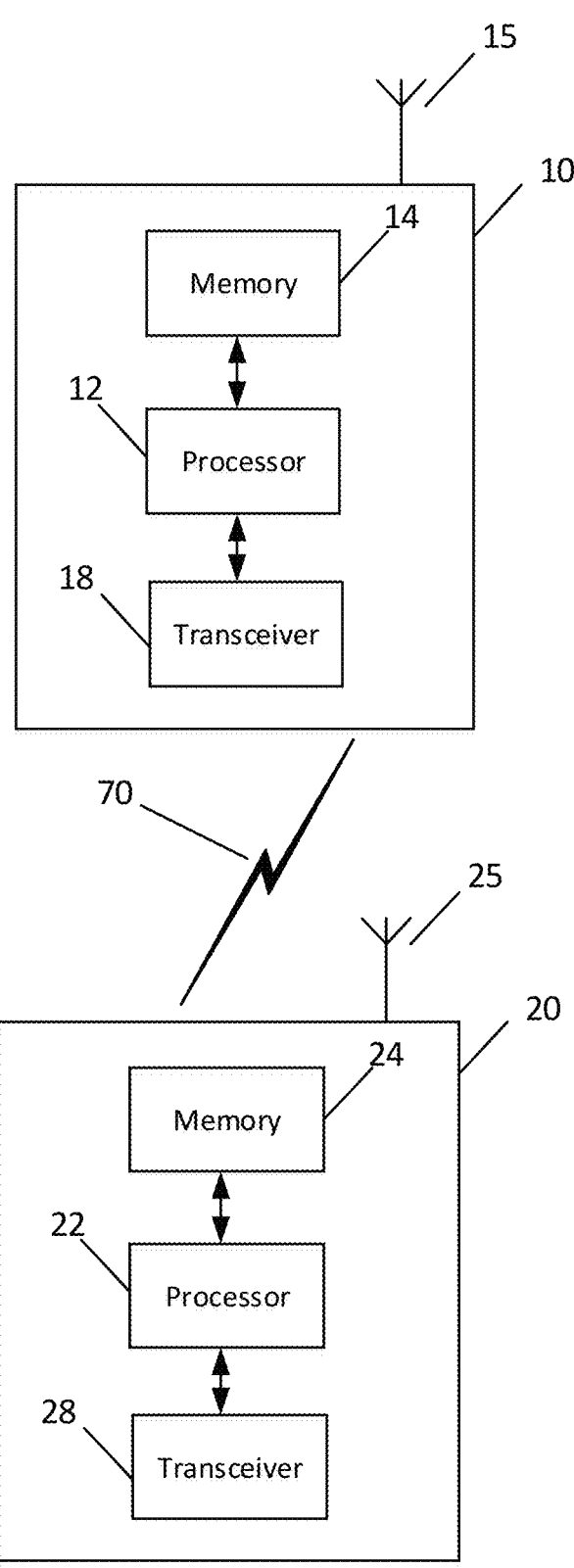
FIG. 10 illustrates a set of apparatuses, according to certain example embodiments.

FIG. 10 illustrates a set of apparatuses 10 and 20 according to certain example embodiments. In certain example embodiments, the apparatus 10 may be an element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 10.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 10, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 10, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes and examples illustrated in FIGS. 1-8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods and examples illustrated in FIGS. 1-8.

In some example embodiments, apparatus 10 may also include or be coupled to one or more antennas 15 for receiving a downlink signal and for transmitting via an UL from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to to register with a communication network. Apparatus 10 may also be controlled by memory 14 and processor 12 to transmit user equipment activity information to a machine learning engine of the communication network. Apparatus 10 may further be controlled b y memory 14 and processor 12 to receive an assigned soft preamble from the machine learning engine based on the user equipment activity information. In addition, apparatus 10 may be controlled by memory 14 and processor 12 to perform message 1 transmission using the assigned soft preamble based on a preamble load.

As illustrated in the example of FIG. 10, apparatus 20 may be a network, core network element, or element in a communications network or associated with such a network, such as a gNB, NW, or ML engine. It should be noted that one of ordinary skill in the art would understand that apparatus 20 may include components or features not shown in FIG. 10.

As illustrated in the example of FIG. 10, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes and examples illustrated in FIGS. 1-7 and 9.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods and examples illustrated in FIGS. 1-7 and 9.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an UL).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to receive user equipment activity information from a network element. Apparatus 20 may also be controlled by memory 24 and processor 22 to assign a same soft preamble to a plurality of user equipment based on the user equipment activity information, and based on a map of a network describing preamble load on every preamble in a serving cell and neighboring cells. Apparatus 20 may further be controlled by memory 24 and processor 22 to receive updated user equipment activity information. In addition, apparatus 20 may be controlled by memory 24 and processor 22 to dynamically update the soft preamble based on the updated user equipment activity information. Further, apparatus 20 may be controlled by memory 24 and processor 22 to assign assigning an updated soft preamble to the user equipment based on the dynamic update of the soft preamble.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for registering with a communication network. The apparatus may also include means for transmitting user equipment activity information to a machine learning engine of the communication network. The apparatus may further include means for receiving an assigned soft preamble from the machine learning engine based on the user equipment activity information. In addition, the apparatus may include means for performing message 1 transmission using the assigned soft preamble based on a preamble load.

Certain example embodiments may also be directed to an apparatus that includes means for receiving user equipment activity information from a network element. The apparatus may also include means for assigning a same soft preamble to a plurality of user equipment based on the user equipment activity information, and based on a map of a network describing preamble load on every preamble in a serving cell and neighboring cells. The apparatus may further include means for receiving updated user equipment activity information. In addition, the apparatus may include means for dynamically updating the soft preamble based on the updated user equipment activity information. Further, the apparatus may include means for assigning an updated soft preamble to the user equipment based on the dynamic update of the soft preamble.

Certain example embodiments described herein provide several technical improvements, enhancements, and/or advantages. For instance, in some example embodiments, it may be possible to ensure backward compatibility. Additionally, a UE that supports soft preamble assignment may read the PLI in SIB1, and randomly select a preamble from a pool that is not loaded or lightly loaded, thereby experiencing improved performance compared to a legacy UE. According to other example embodiments, the soft preamble framework may provide a network where Message 1 transmission is not completely random. Randomness during Message 1 may be scaled as per the load on a particular cell/beam, and RACH success probability may be increased. Additionally, certain example embodiments may provide collision-free performance in lightly loaded cells, and the soft preamble framework may decrease latency, especially in low load conditions.

According to other example embodiments, the soft preamble framework may consider user activity to ensure that all the preambles are used efficiently, and the soft preamble framework may be adaptive in the sense that the ML engine may adapt to the UE activity statistics and assign a new SoftPre if the UE starts behaving contrary to the stored UE history. Further, in certain example embodiments, reduced collisions may directly improve RACH efficiency and reduce interference because a UE that collides may transmit another preamble with higher power. The soft preamble framework of certain example embodiments may also ensure that the UE's preamble is sent successfully in the first instance, which may free up subsequent PRACH occasions for other UEs.

In other example embodiments, the PLI may provide UEs with real-time a priori information of load in various preamble pools, thus avoiding unnecessary preamble transmissions in overloaded pools. Additionally, PLI may provide autonomous overload control. For instance, when UEs observe an overloaded pool, the UEs may stop transmitting preambles in those pools, thereby reducing the overload situation.

According to certain example embodiments, additional advantages may include the ability to optimize Message 1 success rate at a granularity of a user, and the ability to trouble shoot Message 1 at a per UE level. Furthermore, the rich statistical information available from the ML engine may create many network optimization and RRM adaptation use cases. For example, preamble usage statistics may be used to optimize preamble allocation per beam. In particular, cells where preambles are continuously loaded may be considered for increase in number of preambles. Additionally, the information from the ML engine may provide differentiation between a temporary overload situation and permanent overload situation. Temporary overload situations may be alleviated by increasing number of preambles at certain times of the day or certain days. Furthermore, if it is ascertained from the ML engine statistics that certain cells have low usage of preambles and PRACH occasions, the PRACH occasions on those cells may be reduced, thus freeing up capacity for user data. Various such planning and optimization activities may make use of the statistics available in the ML engine.

As noted above, by using the soft preamble framework, it may be possible to reduce or eliminate handover failures which may occur due to preamble collisions on the target cell when CBRA is used. Due to improved preamble success rates, recovery from RLF and beam failure recovery (BFR) may also be improved, which may ultimately reduce the signaling load resulting from failure of BFR procedures.

In other example embodiments, the ML engine may maintain a history of UE statistics, but the communication with the AMF and gNB may be performed using temporary identities thereby eliminating privacy concerns. According to other example embodiments the framework may be enhanced and extended to new use cases. Additionally, some example embodiments of the soft preamble framework may provide an accurate and holistic network view of the preamble load per cell/beam. Every UE that is switched on may be accounted for and, thus, the chance of the ML engine reaching an unstable state is nearly impossible.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary: | |
| --- | --- |
| 3GPP | 3rd Generation Partnership Project |
| 5G | 5th Generation |
| 5GCN | 5G Core Network |
| 5GS | 5G System |
| AMF | Access and Mobility Management Function |
| BFD | Beam Failure Detection |
| BM | Beam Management |
| BS | Base Station |
| CBRA | Contention Based Random Access |
| CFRA | Contention Free Random Access |
| DL | Downlink |
| eNB | Enhanced Node B |
| E-UTRAN | Evolved UTRAN |
| FPS | Frames Per Second |
| gNB | 5G or Next Generation NodeB |
| HO | Handover |
| IP | Intellectual Property |
| LTE | Long Term Evolution |
| M2M | Machine to Machine |
| ML | Machine Learning |
| mMTC | massive Machine Type Communications |
| MRU | Mobility Registration Update |
| NR | New Radio |
| NW | Network |
| ORAN | Open RAN |
| PLI | Preamble Load Indicator |
| PRACH | Physical Random Access Channel |
| PRU | Periodic Registration Update |
| QoS | Quality of Service |
| RA | Registration Area |
| RACH | Random Access Channel |
| RIC | RAN Intelligent Controller |
| RLF | Radio Link Failure |
| RNA | RAN-based Notification Area |
| RNAU | RAN-based Notification Area Update |
| RRC | Radio Resource Control |
| RRM | Radio Resource Management |
| SON | Self Organizing Network |
| SSB | Synchronization Signal Block |
| UE | User Equipment |
| UL | Uplink |
| URLLC | Ultra Reliable Low Latency Communications |

I claim:

1. A method comprising:
transmitting user equipment activity information to a machine learning engine of a communication network;
receiving an assigned soft preamble from the machine learning engine based on the user equipment activity information; and
performing message 1 transmission using the assigned soft preamble based on a preamble load.

2. The method according claim 1, further comprising: receiving an updated soft preamble from the machine learning engine based on changes in the user equipment activity information.

3. The method according to claim 1, wherein the user equipment activity information comprises at least one of the following: user equipment location change events, preamble transmission, preamble overload, or preamble collision events.

4. The method according to claim 3, wherein the user equipment location change events comprise at least one of the following: user equipment registration to a network, a mobility registration update or a periodic registration update, a radio access network based notification area update, or handover information of a user equipment.

5. An apparatus, comprising:
at least one processor; and
at least one memory storing instructions that, when executed by the at least one processor, cause the apparatus at least to:
transmit user equipment activity information to a machine learning engine of a communication network;
receive an assigned soft preamble from the machine learning engine based on the user equipment activity information; and
perform message 1 transmission using the assigned soft preamble based on a preamble load.

6. The apparatus according to claim 5, wherein the instructions, when executed by the at least one processor, further cause the apparatus at least to: receive an updated soft preamble from the machine learning engine based on changes in the user equipment activity information.

7. The apparatus according to claim 5, wherein the user equipment activity information comprises at least one of the following: user equipment location change events, preamble transmission, preamble overload, or preamble collision events.

8. The apparatus according to claim 7, wherein the user equipment location change events comprise at least one of the following: user equipment registration to a network, a mobility registration update or a periodic registration update, a radio access network based notification area update, or handover information of the apparatus.

* * * * *